US005247331A

United States Patent [19]

Rydelek

[11] Patent Number: 5,247,331

[45] Date of Patent: Sep. 21, 1993

[54] COLOR IMAGE FORMING APPARATUS WITH TRANSLATABLE DEVELOPMENT APPARATUS HAVING AN INTEGRAL WHEEL MOUNT

[75] Inventor: James G. Rydelek, Rochester, N.Y.

[73] Assignee: Eastman Kodak Company, Rochester, N.Y.

[21] Appl. No.: 794,753

[22] Filed: Nov. 19, 1991

[51] Int. Cl.[5] .............. G03B 15/06

[52] U.S. Cl. .............. 355/245; 355/326

[58] Field of Search .............. 355/326, 327, 245; 118/645; 346/157

[56] References Cited

U.S. PATENT DOCUMENTS 4,797,704 1/1989 Hill et al. .............. 355/260
4,941,018 7/1990 Kasamura .............. 355/245
4,947,215 8/1990 Chuang .............. 355/274
5,031,004 7/1991 Borostyan .............. 355/327
5,053,820 10/1991 Preszler et al. .............. 355/245

*Primary Examiner*—Leo P. Picard
*Assistant Examiner*—Christopher Horgan
*Attorney, Agent, or Firm*—Leonard W. Treash, Jr.

[57] ABSTRACT

A development apparatus for applying toner of different colors to electrostatic images at a single development position, which moves translationally to align each of a series of development units with the development position. The development units are supported in a movable carriage which carriage includes a translation plate. The translation plate is supported on the floor or other similar surface by a set of wheels which wheels are secured to said translation plate by integrally molded mounts. The mount includes a surface for receiving an axle for the wheels, snaps for holding the axle against the surface and a retaining wall for preventing axial movement of the axle. The yoke also restricts movement of its wheel parallel to its axis of rotation.

4 Claims, 8 Drawing Sheets

COLOR IMAGE FORMING APPARATUS WITH TRANSLATABLE DEVELOPMENT APPARATUS HAVING AN INTEGRAL WHEEL MOUNT

FIELD OF THE INVENTION

This invention relates to the development of electrostatic images. It also relates to a wheel mount which is integrally formed with a translation plate or other similar element in a translatable development apparatus.

BACKGROUND ART

U.S. Pat. No. 4,941,018, Kasamura issued Jul. 10, 1990 shows a rack and pinion mechanism (FIG. 27) in an electrophotographic copier with interchangeable development stations. The development stations are movable (FIG. 27) through a position aligned with a development position. The stations are moved through a vertically oriented guide shaft attached to the external portion of the apparatus.

U.S. Pat. No. 4,947,215 granted to Chuang, Aug. 7, 1990 shows a liquid development mechanism in which four development stations are positioned on a "trolley" which translates. No details of the mounting of the trolley are given.

In recent years, small desk top printers have been designed for easy manufacturing with a limited number of metal fastening devices, for example, a minimum number of bolts or screws. These printers include as much as possible the use of plastic snap fitting parts which, for example, are molded to a pair of multifunctional mechanism plates.

DISCLOSURE OF THE INVENTION

It is an object of the invention to provide an apparatus for applying toner of different colors to each of a series of electrostatic images carried by an image member at a development position, which apparatus includes a plurality of development units positioned in side by side relation on a movable carriage that is simple in construction and assembly.

It is another object of the invention to provide a wheel mount the majority of which mount is moldable integrally with a plate or other element to be supported by the wheel.

The first object above is accomplished by a development apparatus generally of the type described having a plurality of development units positioned in side by side relation on a movable carriage. The carriage includes a translation plate which is movable to index the development units through a position generally opposite the development position. The translation plate has wheels affixed to the bottom of the plate which rest on the floor or other support structure. The wheels allow translation of the plate. For simplicity in manufacture and assembly, the mounts for the wheels are integrally molded into the translation plate.

According to a preferred embodiment, the mount includes a yoke for receiving an axle for the wheel and also for defining the location of the wheel. The mount also includes integrally molded plastic snap means located outside of the yoke for engaging the axle and holding it against the yoke. The mold also includes an axle retaining means preventing movement of the axle parallel to its axis. Each of these elements is moldable in the bottom of the translation plate, preferably, using unidirectional injection molding. An advantage is that assembly is also unidirectional and simple.

Although the wheel and axle mount described herein is designed for use with the development apparatus also described, and is particularly usable with it, it has general application in the mounting of a wheel to any element made of a moldable material and having a function generally similar to that of the translation plate shown herein.

BRIEF DESCRIPTION OF THE DRAWINGS

In the detailed description of the preferred embodiment of the invention presented below, reference is made to the accompanying drawings, in which.

BEST MODE OF CARRYING OUT THE INVENTION

Figure 1:
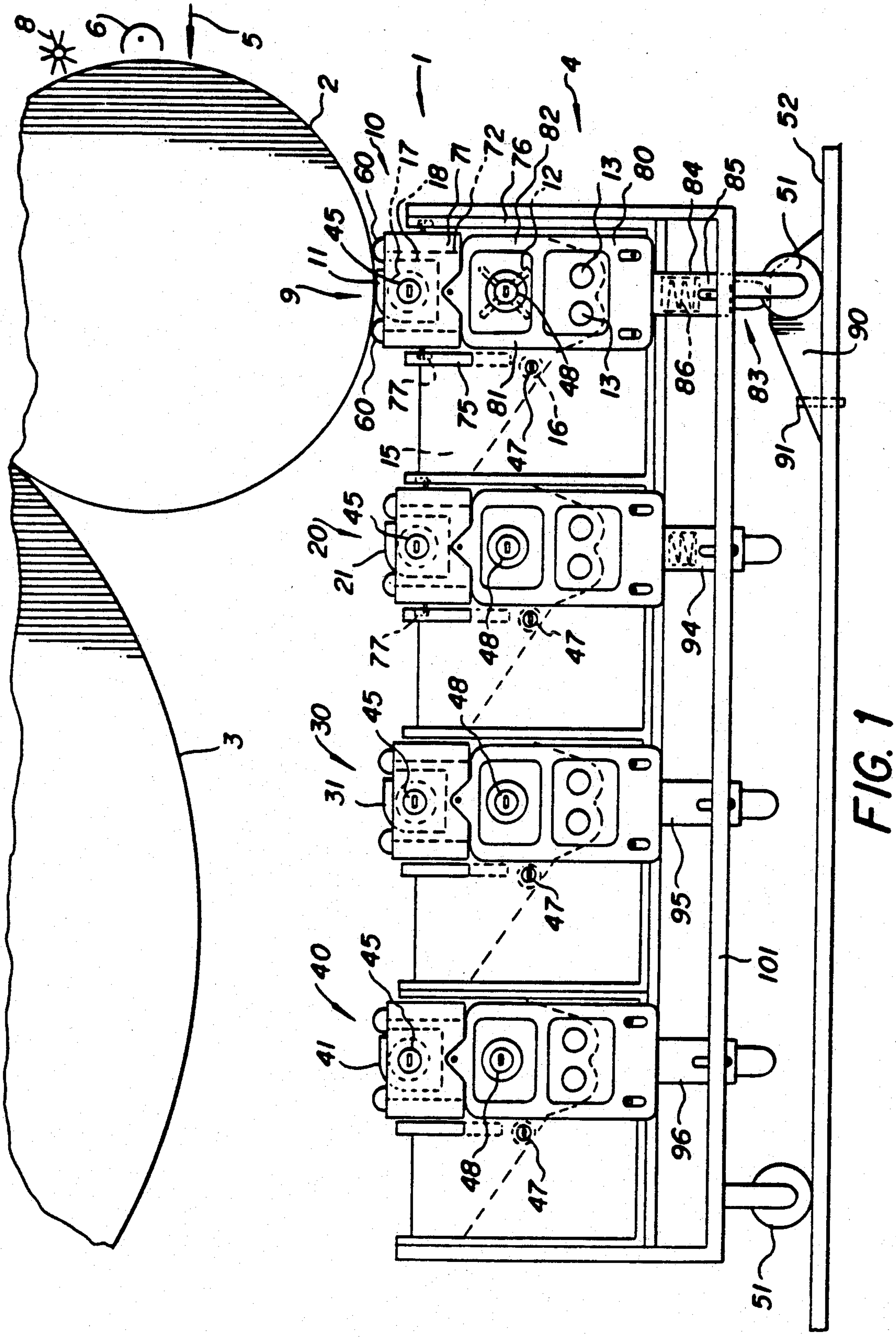
FIG. 1 is a front schematic of an image-forming apparatus of a type in which the invention is useful.
Figure 2:
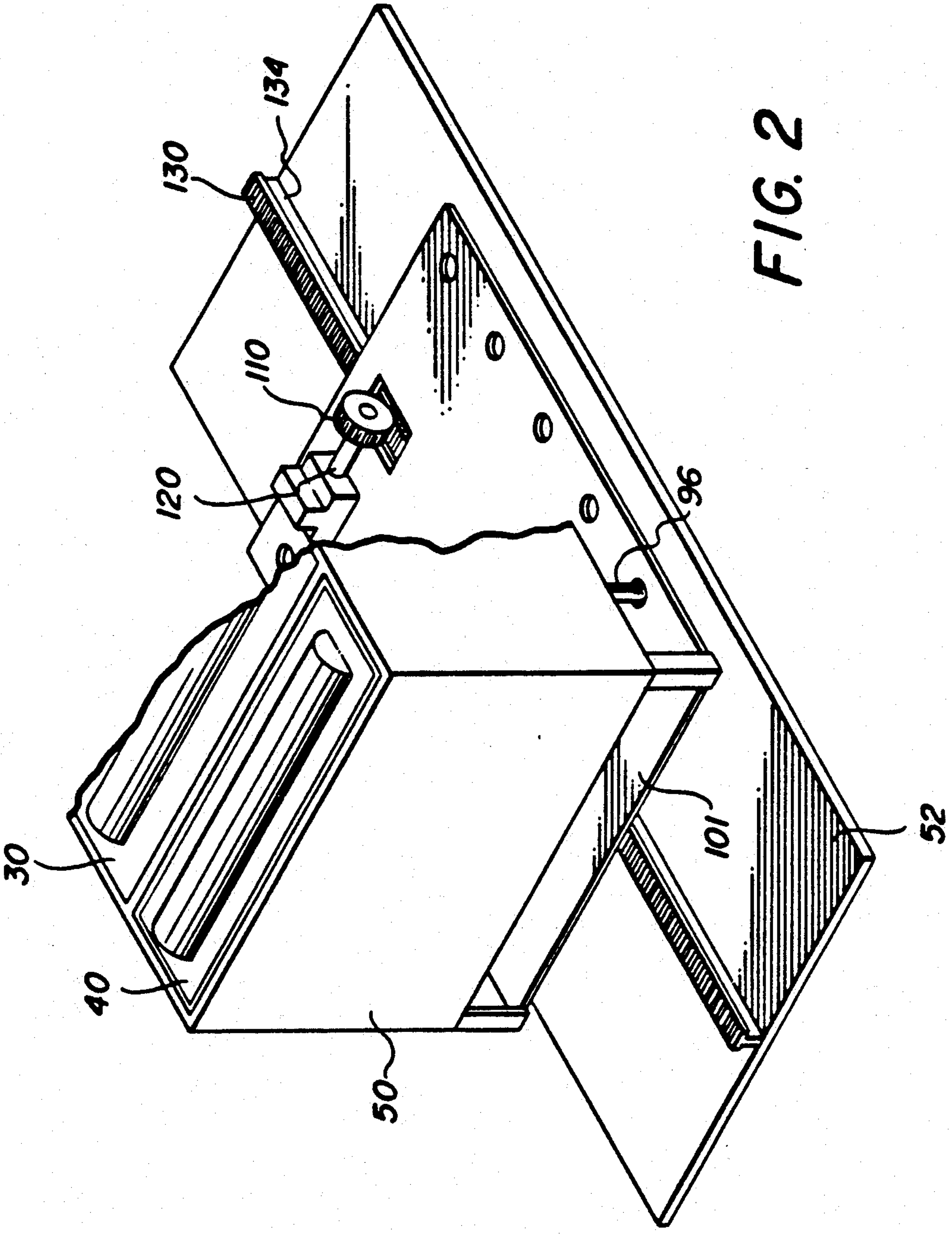
FIG. 2 is a perspective drawing of a developing device similar to that shown in FIG. 1 illustrating a rack and pinion translation device with portions broken away for clarity of illustration.

According to FIG. 1 an electrophotographic color printer 1 includes a photoconductive drum 2 mounted for rotation past a series of stations to create multicolor toner images on a transfer roller 3 or a receiving sheet carried by transfer roller 3, according to a process well-known in the art. More specifically, drum 2 is uniformly charged at a charging station 6, imagewise exposed at an exposure station, for example, a laser exposure station 5 to create a series of electrostatic images. The electrostatic images are developed by a developing apparatus 4 which applies a different color toner to each image of the series of images to form a series of different color toner images. The series of toner images are then transferred in registration to a surface associated with transfer roller 3 to create a multicolor toner image. The surface associated with roller 3 can be either the surface of transfer roller 3 or a surface of a receiving sheet secured to the surface of roller 3. If the multicolor image is formed directly on the surface of transfer roller 3, it is best utilized by being transferred to a receiving sheet at a position remote from drum 2 by a means not shown. If the multicolor image is formed on the surface of a receiving sheet carried by roller 3, that sheet is separated from roller 3, also at a position remote from drum 2, also by a means not shown.

Photoconductive drum 2 is made quite small, its periphery being substantially smaller than a single image. A small photoconductive drum allows it to be easily replaced, for example, replaced as part of a process cartridge which can also include charging station 6 and a cleaning station 8. It also contributes to a reduction of the size and cost of the printer 1. Unfortunately, smallness in the photoconductive drum makes application of different color toners to consecutive electrostatic images difficult to accomplish geometrically. Similar to the prior art cited above, printer 1 solves this problem by moving a series of four development units 10, 20, 30 and 40 through a development position 9 allowing each of the electrostatic images to be toned by a different developing unit but using only a single developing position 9 associated with the drum 2.

According to FIG. 1 the development units 10, 20, 30, and 40 are all fixed in a laterally moving carriage 50. Carriage 50 has a set of four supporting rollers 51 which allow carriage 50 to rest and move on floor 52 of printer 1. The drive mechanism for moving carriage 50 is not shown in FIG. 1, but is shown in more detail in FIGS. 2–5.

In FIG. 1, developing unit 10 is shown aligned with development position 9. Preferably, carriage 50 has a start position to the left of the position shown in FIG. 1 and moves to the position shown in FIG. 1 to develop the first electrostatic image of a series. When that image is toned, the carriage again is moved to align developing unit 20 for toning the second electrostatic image. Units 30 and 40 are similarly aligned with position 9 to tone the third and fourth electrostatic images. The carriage 50 is then returned to its start position.

Developing unit 10 includes an applicator 11, a mixing device, for example, paddle 12 and augers 13. The mixing device is located in a development chamber 14 which includes a mixture of hard magnetic carrier particles and insulating toner particles. A supply of toner is contained in a toner chamber 15. Toner is fed from the toner chamber 15 to the development chamber 14 by a toner feed roller 16.

Construction and operation of each unit is essentially the same as the unit described in U.S. Pat. No. 4,797,704, issued to Hill et al on Jan. 10, 1989, the disclosure of which patent is incorporated by reference herein. In operation, rotation of paddle 12 and augers 13 cause both the mixing of developer in chamber 14 and a raising of the level of that developer making it accessible to the magnetic field of applicator 11. Applicator 11, as described more thoroughly in the above patent, includes a rotatable magnetic core 17 and a stationary sleeve 18. Hard magnetic carrier particles move around the sleeve 18 in response to rotation of the core, bringing the developer (carrier and toner) through developing position 9. The developer is moved by the rotating core at essentially the same speed as the electrostatic image is moving on rotating drum 2 providing high quality development of the electrostatic image. Development units 20, 30 and 40 are of essentially the same construction; although note that the toner chamber 45 of developing unit 40 is larger than the other toner chambers. The development unit 40 contains black toner which is used more often than the color toners in units 10, 20 and 30. Units 10, 20 and 30 can have cyan, magenta and yellow toners for doing full color reproductions or could hold highlight color toners, for example, red, blue and yellow.

Figure 11:
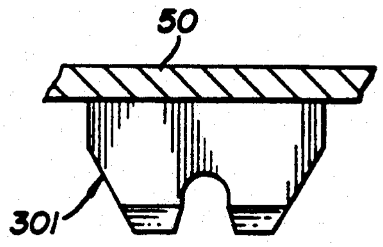

The development system utilized by development units 10, 20, 30 and 40 requires a small precise spacing between the sleeve 18 of applicator 11 and the drum 2. This is accomplished, according to FIG. 1, by four rollers 60, one on each side of the applicator on each end of unit 10. Rollers 60 are precisely positioned and sized so that, when urged against drum 2 as shown in FIG. 11 with unit 10, they precisely space applicator 11 with respect to drum 2.

In the prior art cited above, each developing unit is aligned with a developing position. Either after it is aligned or as it is aligned, the unit is moved with respect to the other units toward the development position to engage a photoconductive drum. This latter movement requires that each of the developing units be movable with respect to each other. It requires a separate driving means such as a rotatable cam for moving each separate unit, which means must be timed with the drive means for the aligning movement.

The developing device 4 according to FIG. 1 substantially improves on this prior apparatus by fixing the development units 10, 20, 30 and 40 with respect to each other in the carriage 50. As each development unit becomes aligned with developing position 9, the applicator 11 is moved with respect to the rest of the unit toward drum 2 to seat rollers 60 on drum 2.

To accomplish this objective, applicator 11 is mounted on an applicator block 71 to form with applicator 11 and rollers 60, an applicator assembly. Applicator block 71 has an opening 72 in which applicator 11 is mounted. Opening 72 is larger than applicator 11 allowing developer from chamber 14 to move around sleeve 18 during development of an image. Applicator block 71 is loosely mounted in side walls 75 and 76 by mounting means 77 which allow limited movement of block 71 in a vertical direction. The side walls of block 71 fit loosely against side walls 75 and 76 allowing some lateral and tilting movement of block 71. A pair of lifters 80 are pivotably attached to opposite ends of the applicator block 71 and loosely attached to the ends of unit 10. Similar lifters are associated with units 20, 30 and 40.

Directly below each lifter 80 in carriage 50 is an engaging pin 83. Engaging pin 83 includes a sleeve 84, a pin core 85 mounted within sleeve 84 and a spring 86 within sleeve 84 urging pin core 85 in a downward direction. A pin and slot in pin core 85 and sleeve 84, respectively, prevent movement of pin core 85 out of sleeve 84. A pair of wedges 90 are pivotally secured to the base of the printer by pivots 91 and are aligned with the front and rear series of engaging pins, respectively.

As carriage 50 is moved from left to right as shown in FIG. 1, each of engaging pins 83 engages one wedge 90 as developing unit 10 becomes aligned with developing position 9. Engagement of pin 83 with wedge 90 forces core 85 in an upward direction against the force of spring 86. Spring 86 then urges the top of sleeve 84 against lifter 80 to urge lifter 80 in an upward direction against applicator block 71. Block 71 is moved upward until rollers 60 rest against drum 2 to position applicator 11 at the development position accurately spaced from drum 2. After development of a first electrostatic image, the carriage 50 is driven further to the right. Gravity and two of rollers 60 urge block 71 and lifter 80 down to its original position. This movement can be assisted by a cantilever spring (not shown) urging block 71 downward against spring 86. Carriage 50 moves to the right until applicator 21 of development unit 20 becomes aligned with exposure position 9 and engaging pins 94 engage wedges 90 to move applicator 21 into appropriate position for toning a second electrostatic image. The process is repeated for developing units 30 and 40 with applicators 31 and 41 being moved into position in response to engagement of wedges 90 by engaging pins 95 and 96 respectively.

Note that if a slight amount of misalignment of unit 10 occurs, the loose mounting of block 71 between the side walls 75 and 76 and the pivotal attachment of block 71 to lifter 80 allows some tilting and lateral movement of the block to accurately space applicators 11, 21, 31 and 41 as controlled by rollers 60 on the surface of drum 2.

Motor 120 is reversed after all four images have been toned and the carriage 50 is returned to the left to its original position. To improve the clarity of FIG. 1, a preferred drive system for the carriage is not shown. This drive system is shown in FIGS. 2-6.

According to FIGS. 2-6, carriage 50 includes a translation plate 101 affixed to and spaced from the bottom of the development units 10-40. A pinion 110 and its motor 120 are fixed to the top of translation plate 101 and are spring-urged by a leaf spring 115 (FIG. 3) into a rack 130 fixed to floor 52. Four rollers 51 (FIGS. 1, 4 and 5) support translation plate 101 on floor 52 for translational movement along rack 130. This movement is smooth and low in friction and therefore readily accomplished with a relatively small motor 120.

Figure 4:
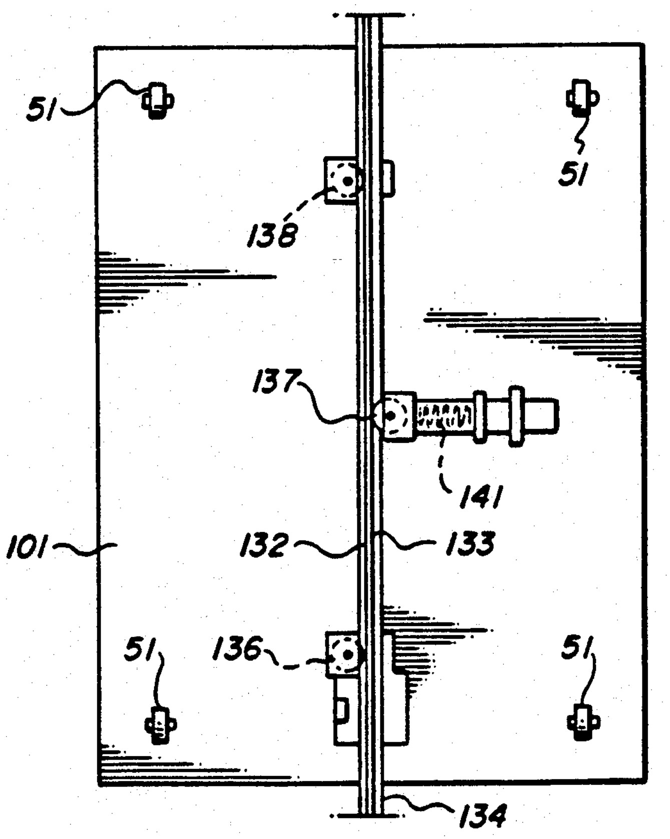
FIG. 4 is a bottom view of a translation plate and rack shown in FIGS. 2 and 3.
Figure 5:
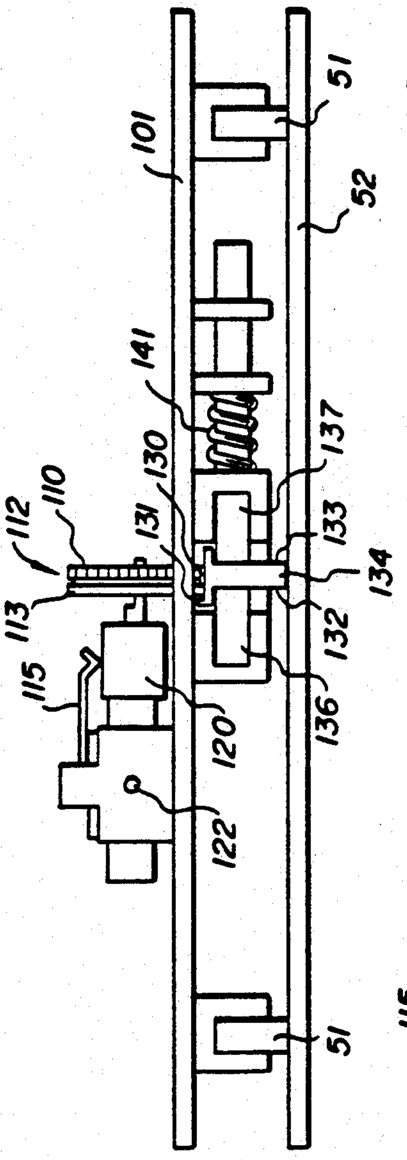
FIG. 5 is a left side view of the translation plate and rack shown in FIGS. 2 and 4.
Figure 6:
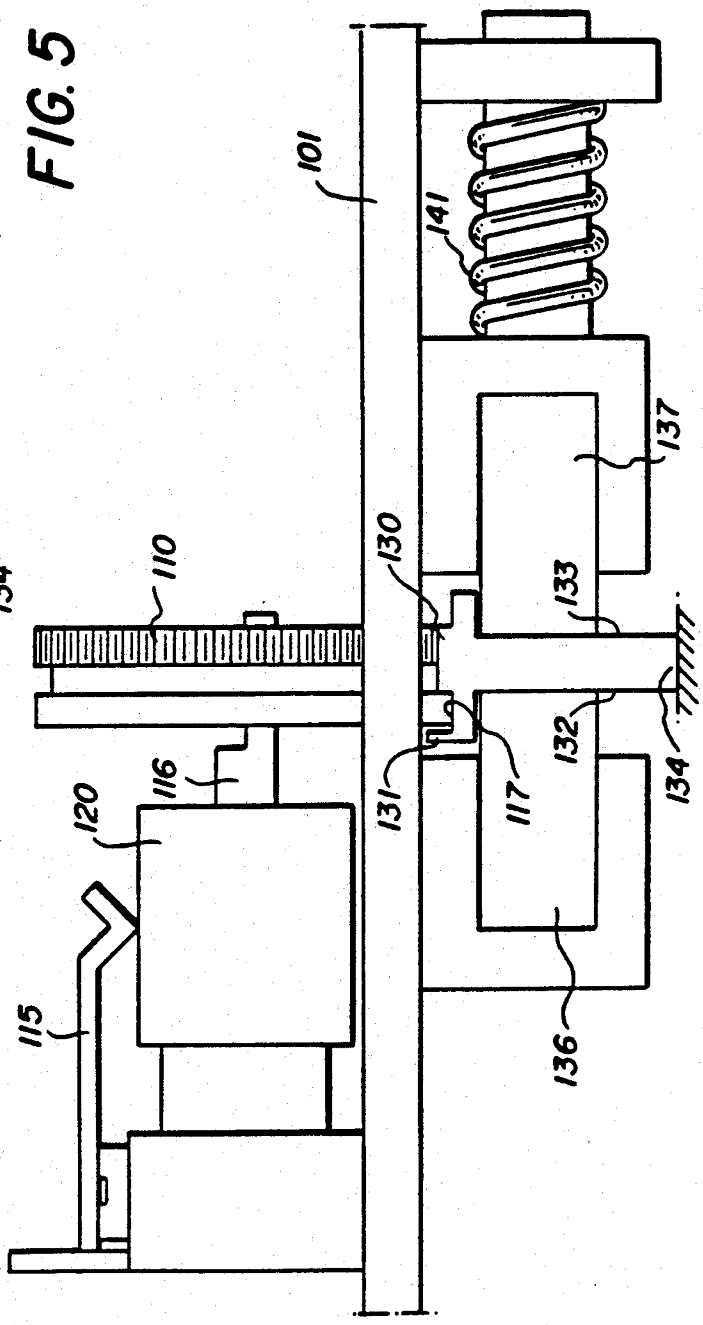
FIG. 6 is an enlarged left side view of a portion of the structure shown in FIG. 5.

However, it is important that pinion 110 maintain engagement with rack 130 and also that carriage 50 maintain accurate alignment with development position 9 and drum 2. To accomplish this, rack 130 is formed in the top of an elongated member 134 which is T-shaped in cross-section and is best seen in FIGS. 5 and 6. Elongated member 134, in addition to having rack 130 on the top of the T, has side surfaces on the stem of the T that form rails 132 and 133 for three rollers 136, 137 and 138, all of Which are mounted on translation plate 101. Rollers 136 and 138 are fixed in position with respect to translation plate 101 and are aligned along its path of movement. They are positioned to engage elongated member 134 along the left rail 132 as seen in FIGS. 4 and 5.

Roller 137 is also mounted on translation plate 101, but is positioned on the opposite side of elongated member 134 from rollers 136 and 138 and is positioned between them. It is not fixed in position, but is urged by a spring 141 into engagement with the right-rail 133. Spring 141 pushes roller 137 against elongated member 134 to essentially pull translation plate 101 to the right as seen in FIGS. 4, 5 and 6 until both rollers 136 and 138 firmly engage the left rail 132 of elongated member 134. This arrangement effectively aligns translation plate 101 with rack 130 to the extent of the accuracy of the positioning of rollers 136 and 138.

Figure 3:
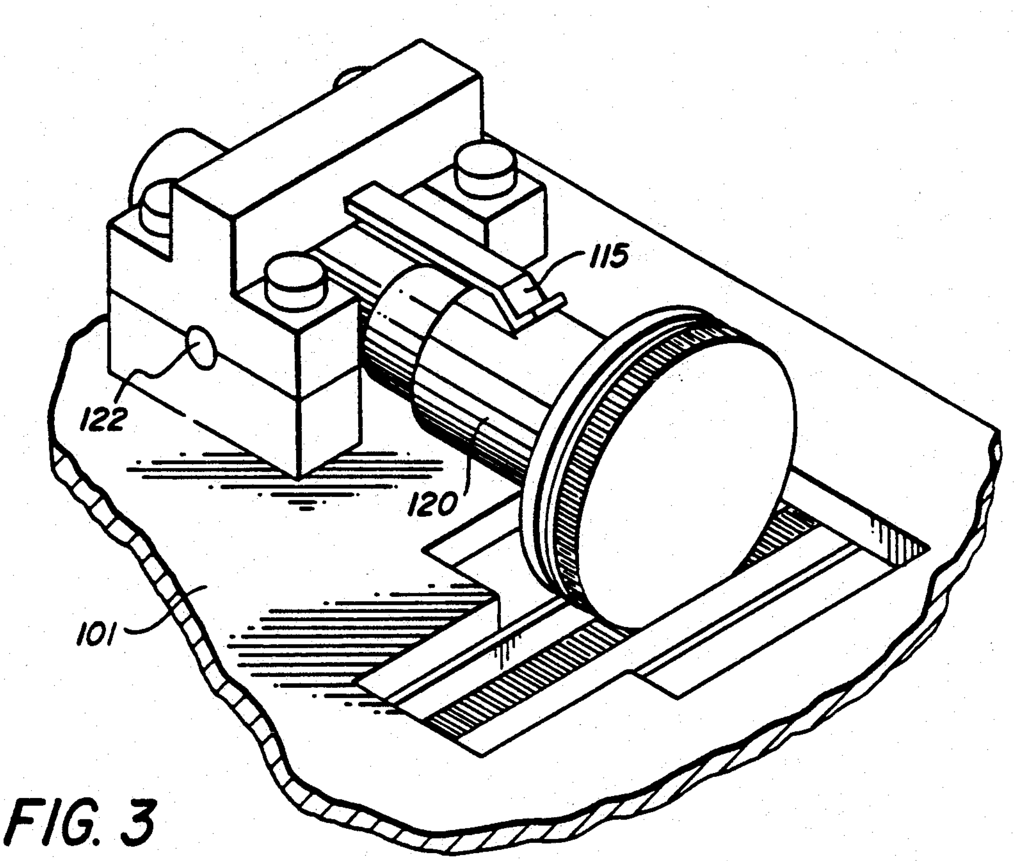
FIG. 3 is a perspective view of a pinion engaging a portion of the rack shown in FIG. 2.

The motor 120 is pivotally mounted at 122 (FIG. 3). This allows retainer spring 115 (aided by the weight of motor 120) to force pinion 110 into rack 130 and maintain appropriate engagement between pinion 110 and rack 130 without requiring precision in size and placement of rollers 51.

Pinion 110 is part of a pinion component 112 shown best in FIG. 6. Pinion component 112 is positioned on a shaft 116 and driven by it. It is free to slide axially on shaft 116 (a substantial advantage in assembly) and is contained in such axial movement by the top of elongated member 134. Pinion component 112 includes as an integral unit pinion 110 and a pitch cylinder 113. Pitch cylinder 113 contacts a pitch control surface 117 adjacent rack 130 to control the depth of the teeth in the mating of the rack and pinion. A rack stop 131 and rack 130 limit axial movement of pitch cylinder 113 and therefor control axial movement of pinion component 112.

Assembly of the apparatus is accomplished merely by sliding the carriage 50 onto the rack 130 until the pinion 110 mates with the rack 130. The pinion can then drive the carriage to any desired start position. Removal is the reverse. Essentially, pinion 110 drives carriage 50 to an accessible position or totally out of the printer (for example, through a side panel of the printer).

Shipment of the equipment is unlikely to affect this structure. The mechanical resistance of the motor, pinion and rack with the assistance of spring 115 maintain the components in correct position despite substantial movement and jarring of the printer. The weight of motor 120 assists spring 115 in maintaining engagement between the rack and pinion.

With this structure, extremely accurate tracking of translation plate 101 with respect to rack 130 provides excellent alignment of development units 10, 20, 30 and 40 with development position 9 and assures continued engagement of pinion 110 with rack 130. This is accomplished with a minimum of losses due to friction and with extremely inexpensive parts and construction. Spectacularly, guides and rails (aside from elongated member 134) are eliminated, but the carriage tracks accurately.

Figure 7:
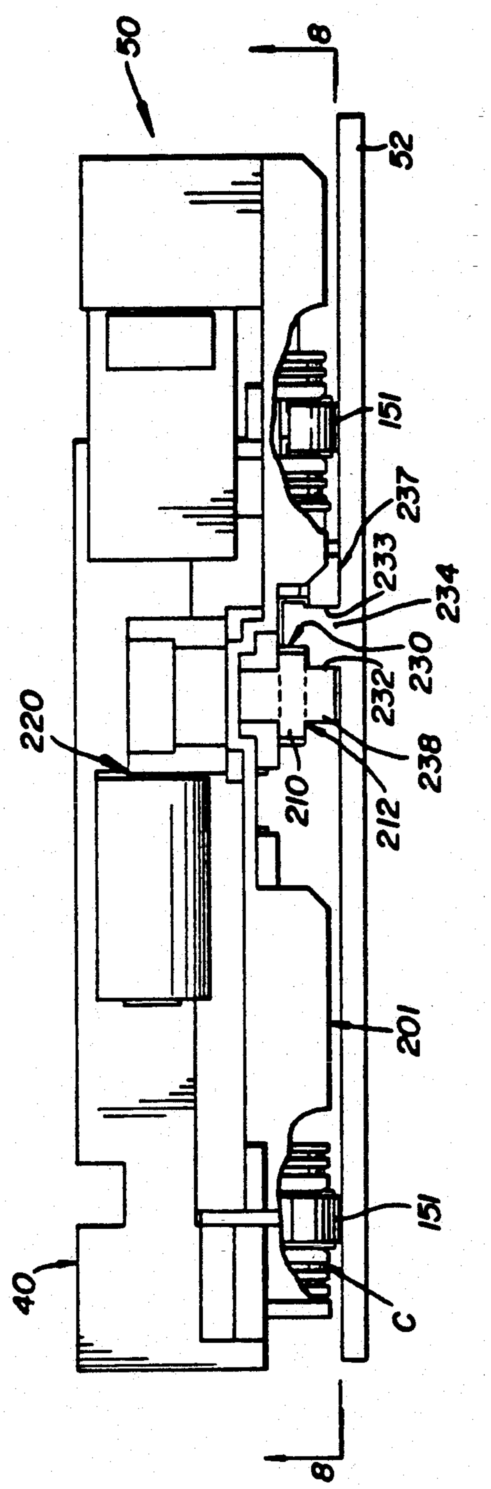
FIGS. 7 and 8 are side and bottom views of an alternative embodiment of the structure shown in FIGS. 4, 5 and 6.
Figure 8:
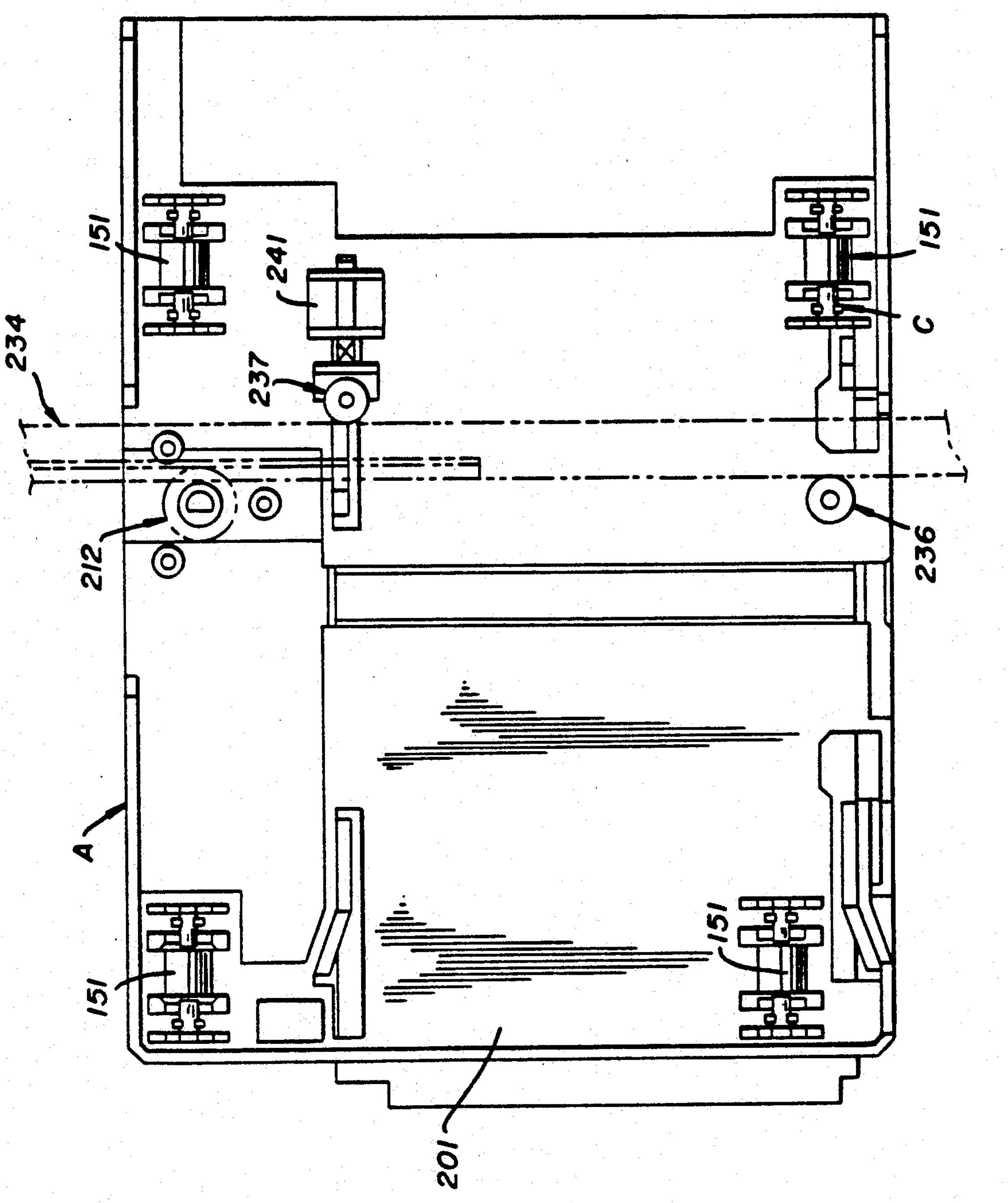

FIGS. 7 and 8 show an alternative rack and pinion structure for driving carriage 50 that has some advantages over the embodiment shown in FIGS. 2-6. According to FIG. 7 carriage 50 supports developer stations as in FIG. 1, with the bottom portion of developer station 40 shown. Carriage 50 is supported on floor 52 by wheels 151 whose mounting will be described in more detail with respect to FIGS. 9-13. The carriage is driven along an elongated member 234 similar in structure to elongated member 134 in the first embodiment. Elongated member 234 is shaped substantially different from elongated member 134 in that a rack 230 is positioned on a vertical side of the upper portion of member 234. Rails 232 and 233 are formed along also vertical walls along lower portions of elongated member 234.

A gear and wheel unit 212 is part of carriage 50 and is driven by a 90° drive motor 220. Gear and wheel unit 212 includes a roller portion 238 and a pinion portion 210.

FIG. 8 is a bottom view taken along lines D—D in FIG. 7 and generally shows that wheel and gear unit 212 has taken the place of roller 138 in FIG. 4. Roller 236 is essentially the same as roller 136 in FIG. 4. The location of elongated member 234 is shown in phantom in FIG. 8. A third roller 237 shown in FIGS. 7 and 8, is essentially the same as the third roller in FIG. 4, roller 137. Roller 237 is spring-urged by a strong spring 241 into rail 233.

Gear and wheel unit 212 includes pinion portion 210 which engages rack 230 to drive carriage 50 along elongated member 234 as in the first embodiment. During this drive, roller portion 238 rides on rail 230 (as does roller 236). Rail 230 is spaced leftward (as seen in FIG. 7) from rack 230 by a distance providing the desired engagement of pinion member 210 into rack 230.

In operation, spring 241 assures the following of the carriage 50 along elongated member 234 and maintains engagement between rack 230 and pinion portion 210 as controlled by roller portion 238. Thus, in this structure, single wheel and gear member 212 replaces separate pinions and roller structures which are separately spring urged into their operative positions. One spring, spring 241, performs the functions of two springs in the first embodiment.

FIGS. 7 and 8 also show a substantially different structure for wheels 151 than was used in FIG. 4 for wheels 51. This structure is shown in more detail in FIGS. 9-13 and will now be described.

Figure 9:
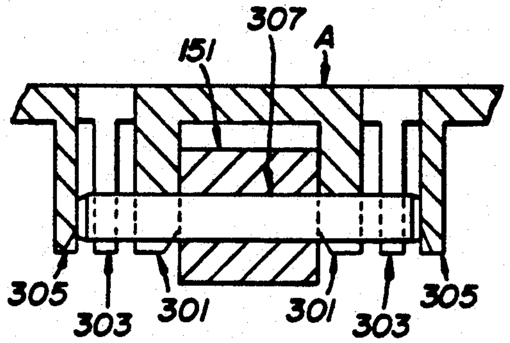
FIGS. 9 and 10 are section and side views of a snap fit structure for wheels shown in FIGS. 7 and 8.
Figure 12:
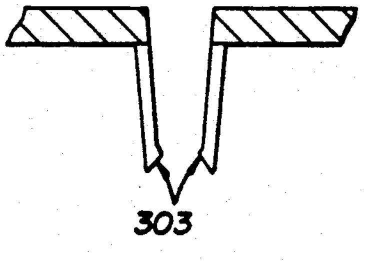
FIGS. 11, 12 and 13 are views taken along view lines A—A, B—B and C—C of FIG. 10, respectively.
Figure 13:
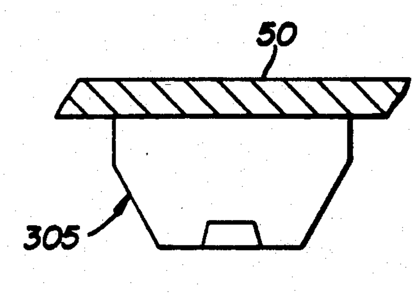
Figure 10:
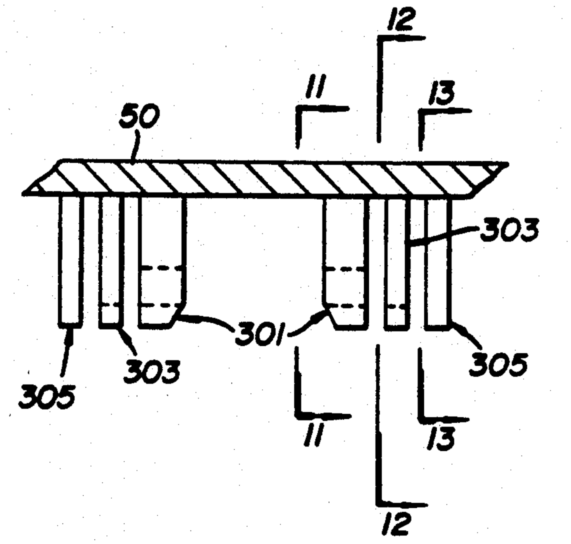

Carriage 50 includes a single plastic translation plate 201 which is injection molded with the mount structure for wheels 151 molded into the plate. With this structure, a single piece includes both the entire translation plate 201 and four mounts for wheels 151. The mounts themselves are best seen in FIGS. 9 and 10. According to FIGS. 9 and 10, each mount includes a yoke 301, snaps 303 and axle retaining walls 305. These are shown in cross-section in FIG. 9 with wheel 151 mounted on an axle 307 and inserted in the mount. FIG. 10 shows a side view of the mount without the wheel and axle. The yoke 301 is shown in FIG. 11 in a front view along lines A—A (of FIG. 10), while a snap 303 is shown in front view in FIG. 12 (taken along line B—B of FIG. 10). An axle retaining wall 305 is shown in front view in FIG. 13 (taken along lines C—C of FIG. 10).

Note that in injection molding translation plate 201, the underside of the mold forms the yoke 301, the outside of the snaps 303 and the axle retaining wall 305 in each instance. The top-side of the mold forms the inside of the snaps 303. The molding can be unidirectional.

At assembly, the carriage is set upside down over the 90° motor 220, preferably on a fixture. A single axle 307 is inserted through a clearance hole in a plastic wheel 151. This wheel and axle assembly is then inserted into the mount so that the wheel 151 is between the two yokes 301 and the axle 307 is retained in the snaps 303 between the retaining walls 305. The yokes 301 provide axle and wheel location. The snap features 303 simply keep the wheels from falling off when the carriage is right-side up. The retaining walls keep the axle from sliding off the wheel. Generous chamfers and lead-in angles on the yokes 301, snap features 303 and retaining walls 305 allows for easy drop-in installation of the wheel 151 with its axle 307.

This structure allows unidirectional injection molding with a single part for both the translation plate 201 and the wheel mounts. Slight modifications can be made to the mount combining, for example, axle retaining walls 305 and snaps 303 into a single structure that also can be molded unidirectionally.

The invention has been described in detail with particular reference to a preferred embodiment thereof, but it will be understood that variations and modifications can be effected within the spirit and scope of the invention as described hereinabove and as defined in the appended claims.

I claim:

1. A development apparatus for applying toner of different colors to each of a series of electrostatic images carried by an image member at a development position, said apparatus comprising:

a plurality of development units positioned in side by side relation on a movable carriage, each unit including means for applying toner to an electrostatic image and each unit including toner of a color different from the toners of each other unit, said carriage including a translation plate, means for moving said carriage to bring the development units sequentially into alignment with the development position, means for mounting said translation plate on a support surface, which support surface is stationary with respect said development position, said mounting means including a plurality of wheels, an axle for each wheel which forms a plurality of wheel and axle combinations, and a mount integral with said translation plate for supporting each of said wheel and axle combinations, said mount being one-piece molded with said translation plate and including yoke means extending downwardly from said translation plate including a surface of semicircular cross-section for receiving and defining the position of an axle and a vertically oriented surface for restricting movement of a wheel, yieldable snap means positioned away from a received wheel from said yoke for resiliently holding an axle against said semi-circular surface and restraining means for restricting movement of an axle in a direction parallel to its axis of rotation.

2. A development apparatus according to claim 1 wherein said mount has been formed by unidirectional injection molding with said translation plate.

3. A development apparatus according to claim 1 wherein said snap means includes a pair of plastic fingers extending downwardly from said translation plate and having detents facing each other, said fingers being spreadable by insertion of an axle or removal of an axle but, in absence of substantial vertical forces, holding said axle against said semi-circular surface.

4. A development apparatus according to claim 1 wherein said means for restricting axial movement of an axle includes a pair of axle retaining walls positioned on sides of said wheel opposite both said snap means and said yoke means.

* * * * *